Sept. 20, 1971   P. G. DAVIS   3,606,300
DEVICES FOR SUPPORTING WORKPIECES
Filed Jan. 13, 1969   4 Sheets-Sheet 1

Inventor
Peter Grant Davis
By
Watson, Cole, Grindle & Watson
(Attorneys)

Sept. 20, 1971    P. G. DAVIS    3,606,300
DEVICES FOR SUPPORTING WORKPIECES
Filed Jan. 13, 1969    4 Sheets-Sheet 4
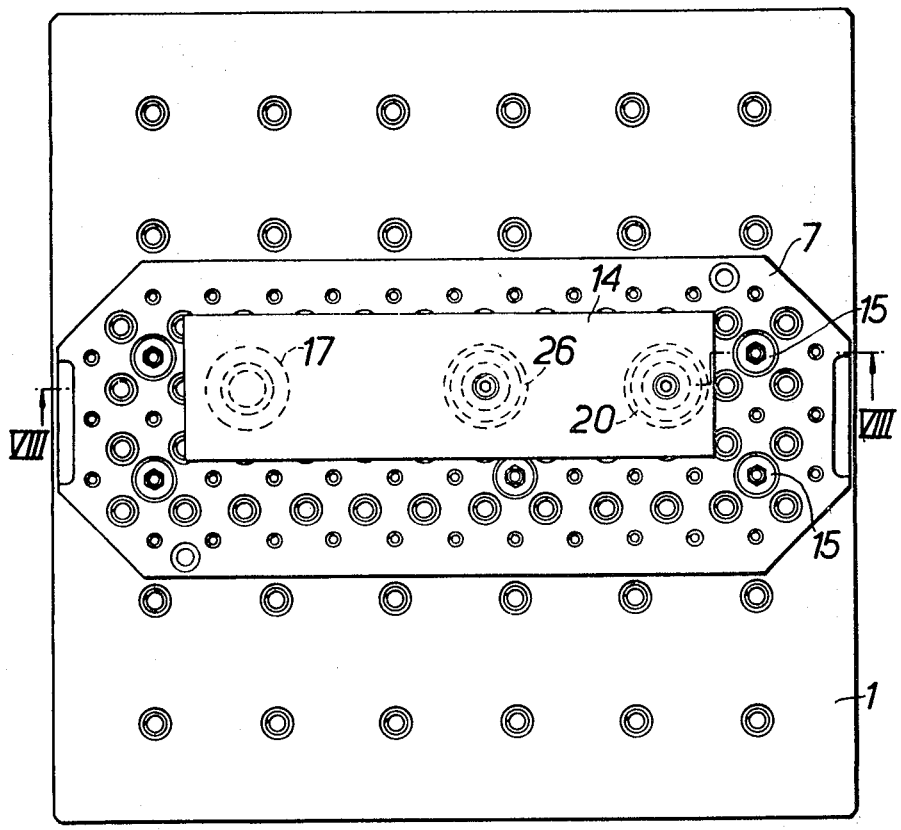
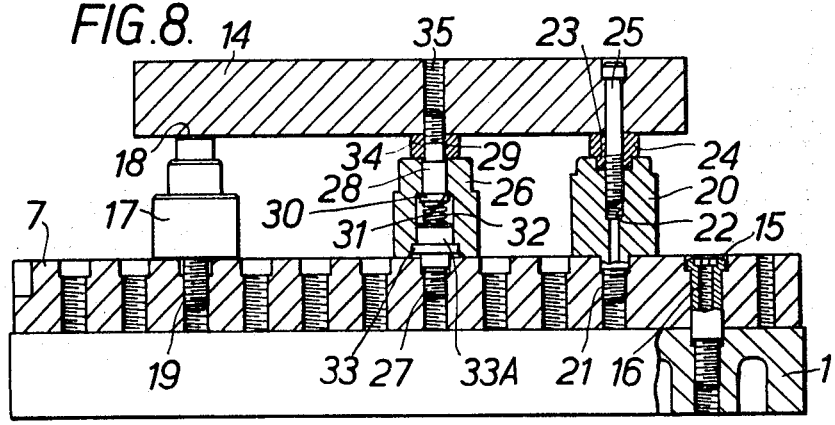

United States Patent Office 3,606,300
Patented Sept. 20, 1971

3,606,300
DEVICES FOR SUPPORTING WORKPIECES
Peter Grant Davis, London, England, assignor to Molins
Machine Company Limited, London, England
Filed Jan. 13, 1969, Ser. No. 790,780
Claims priority, application Great Britain, Jan. 15, 1968,
2,139/68
Int. Cl. B23g 3/00
U.S. Cl. 269—296                                        6 Claims

ABSTRACT OF THE DISCLOSURE

For fixing a workpiece to a pallet having tapped fixing holes at the junctions of a square grid, an intermediate plate member is provided having holes by which it may be secured to the pallet at different positions by means of screws passing into the tapped holes in the pallet. The plate member also has fixing holes at the junctions of a square grid, but of closer spacing for securing supports for the workpiece. A support device is disclosed comprising a housing having a screwed part to screw into a fixing hole in the plate member. The housing contains a spring loaded screw to be screwed into a tapped hole in the workpiece.

---

This invention concerns improvements in or relating to devices for supporting workpieces for machining operations.

In my United States patent application Ser. No. 718,887 filed Apr. 4, 1968 now Pat. No. 3,537,697, there is disclosed an arrangement for supporting workpieces for machining operations comprising a base plate or pallet having tapped fixing holes arranged at the junctions of a square grid, and support devices which can be secured to the base plate or pallet by use of selected ones of the fixing holes. Different positional arrangements of support devices relative to the base plate or pallet can be achieved by using different selections of fixing holes.

In the present specification the term "pallet" will be used to mean "a base plate or pallet."

According to the present invention there is provided an arrangement for supporting workpieces for machining operations comprising a pallet having a plurality of prepared fixing positions, such as tapped holes, arranged in a regular pattern, for example at the junctions of a square grid, a plate member having a plurality of prepared fixing positions, such as holes, arranged so that the plate member can be placed on the pallet in a number of different positional relationships thereto in each of which relationships fixing positions on the plate member register with fixing positions on the pallet, and fixing means to secure the plate member to the pallet at registering fixing positions, said plate member having further prepared positions, such as tapped holes, preferably arranged in a regular pattern, for example at the junctions of a square grid having a spacing less than that of the first said grid, adapted to receive support devices for a workpiece. Different arrangements of support devices relative to the pallet can be achieved by fitting support devices at different selections of said further prepared positions in the plate member, and further by securing the plate member to the pallet in different positional relationships.

The present invention further provides, for example for use with such an arrangement, a support device for supporting a workpiece from and securing the workpiece to a member, for example the said plate member, said support device comprising a hollow housing having an externally threaded part projecting from the bottom thereof and adapted to screw into an internally threaded hole in said member to secure the housing to the member, a screw element movably contained in said housing and having an externally threaded part, and resilient means, such as a spring, to urge said screw element upwardly relative to the housing so that said externally threaded part projects from the top of the housing and can secure a workpiece relatively to the housing by being threaded into a hole in the workpiece.

Devices in accordance with the invention will now be described, by way of example, with reference to the accompanying drawings, in which:

FIG. 7 is a plan view of a workpiece supported from a plate member, as shown in FIG. 4, secured to the pallet shown in FIG. 1, drawn to a larger scale than FIGS. 1 to 6, and FIG. 8 is a sectional view on the line VIII—VIII of FIG. 7.

Figure 1:
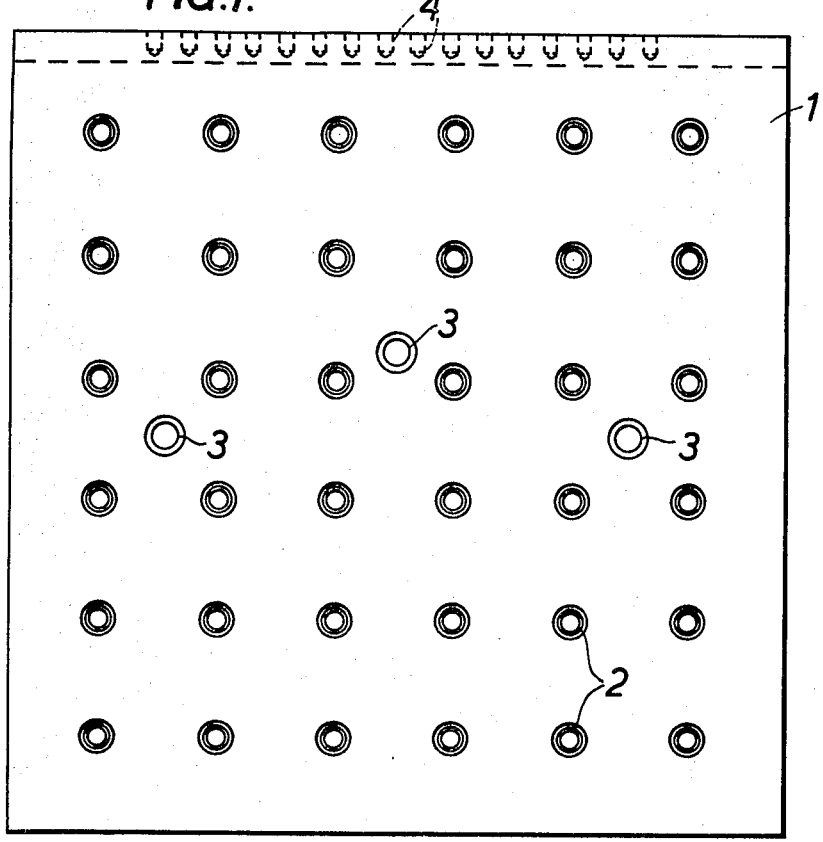
FIG. 1 is a plan view of a pallet.
Figure 2:
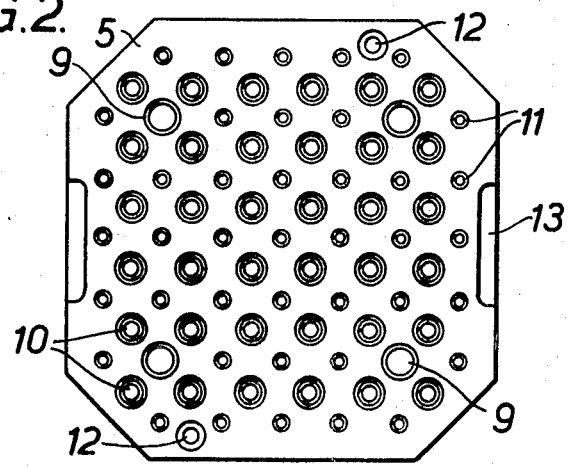
FIGS. 2, 3, 4 and 5 are plan views of plate members for use with the pallet shown in FIG. 1.
Figure 3:
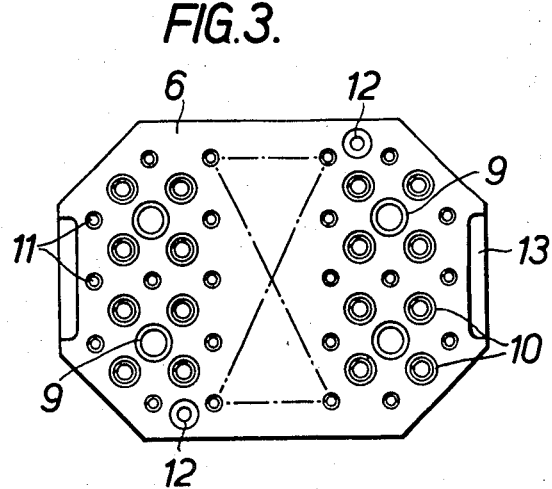

FIG. 1 shows a pallet 1 having counterbored tapped fixing holes 2 arranged at the junctions of a square grid having a spacing, i.e. a distance between adjacent rows and columns, of 50 mm. The pallet 1 also has three holes 3 to accommodate devices by means of which the pallet can be automatically shuffled into accurate position in a numerically controlled machine tool in a manner as described in U.S. Pat. No. 3,243,178. One side face of the pallet has a row of holes 4 each of which can accommodate a plug of either magnetic material or non-magnetic material to provide an identifying binary number for the pallet which can be read, for example, in a manner as described in U.S. patent application Ser. No. 759,740 filed by D. T. N. Williamson et al. on Sept. 13, 1968.

FIGS. 2, 3, 4 and 5 respectively show plate members 5, 6, 7 and 8 of essentially similar configurations but of different sizes. The thickness of the plate members 5, 6, 7, and 8, i.e. the dimension normal to the plane of FIGS. 2 to 5, is the same. Each of the plate members has a number of counterbored unthreaded fixing holes 9 therethrough, the plate members 5 and 6 each having four such holes and the plate members 7 and 8 each having six such holes. In each case the holes 9 are arranged with a spacing of 50 mm. or a multiple of 50 mm. between adjacent holes. Thus, the holes 9 in the plate member 5 (FIG. 2) lie at the corners of a square with a side of 100 mm.; in the plate member 6 (FIG. 3) the holes 9 lie at the corners of a rectangle having sides of 50 mm. and 100 mm.; in the plate member 7 (FIG. 4) a hole 9 lies at each corner of a rectangle having sides of 50 mm. and 250 mm. and also on each of the longer sides of the rectangle at a distance of 100 mm. and 150 mm. respectively, from one end thereof; in the plate member 8 (FIG. 5) a hole 9 lies at each corner of a rectangle having sides of 100 mm. and 250 mm. and also on each of the longer sides of the rectangle at a distance of 100 mm. and 150 mm. respectively, from one end thereof.

With this arrangement of fixing holes 9 in the plate members, each plate member can be placed on the pallet 1 in a number of different positions in each of which the fixing holes 9 in the plate member will register with fixing holes 2 in the pallet. The plate member can thus be secured to the pallet in any of these positions by means of screws passing through the holes 9 and threaded into the registering holes 2.

Each of the plate members 5 to 8 has counterbored tapped holes 10 arranged at the junctions of a square grid having a spacing of 25 mm. Each plate member further has smaller diameter tapped holes 11, also arranged at the junctions of a square grid having a spacing of 25 mm. but offset from the grid of the holes 10 by 12.5 mm. as shown. The fixing holes 9 also lie on the grid of tapped holes 11, and, as more fully described later, the screws which pass through the fixing holes 9 to secure a plate member to the pallet have a tapped hole of the same size as the holes 11 to complete the grid of holes 11 when these screws are in position. For convenience the complete pattern of holes 10 and 11 is not shown in FIGS. 3, 4 and 5 but is readily apparent.

The tapped holes 10 and 11 are used for securing support devices for a workpiece to the plate member. Different positional arrangements of support devices relative to the plate member can be achieved by use of different selections of tapped holes 10 and/or 11, and different positional relationships to the pallet of each such arrangement of support devices can be achieved by securing the plate member to the pallet in different positions as explained previously.

Each plate member 5 to 8 has two further counterbored holes 12 positioned near diagonally opposed corners of the plate member. These holes 12 are provided to accommodate cone elements which, when inserted in the holes, project upwardly from the plate member to provide an accurate positional reference or datum. The cone elements can be used when it is desired to achieve a very accurate positional relationship of the plate member to the pallet. The tips or points of the cones can be located by a microscope to ensure that they, and therefore the plate member, are in the required accurate position.

Each plate member further has a recess or slot 13 at each end whose purpose is to provide a surface, below the upper surface of the plate, by which the plate can be clamped for machining of its upper surface to give an accurate flat finish during the plate's manufacture.

Figure 4:
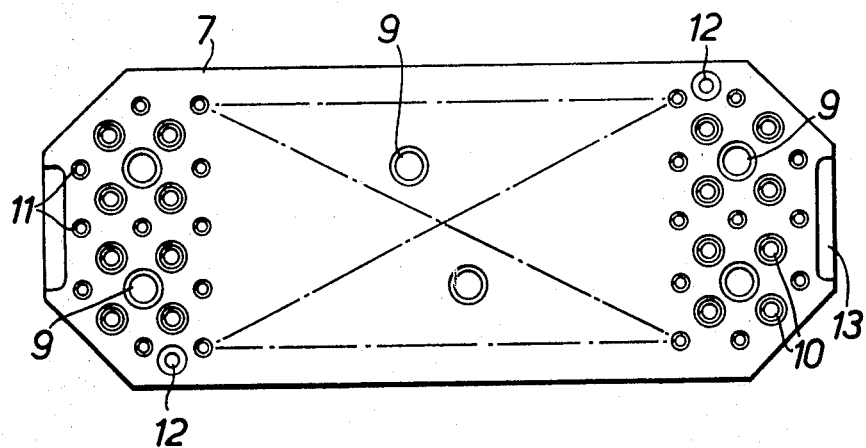
Figure 5:
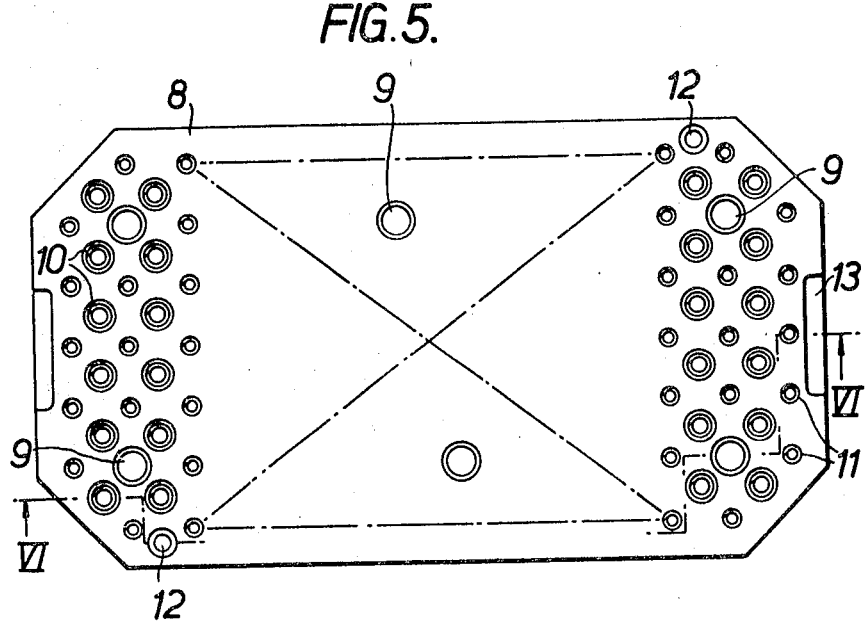
Figure 6:
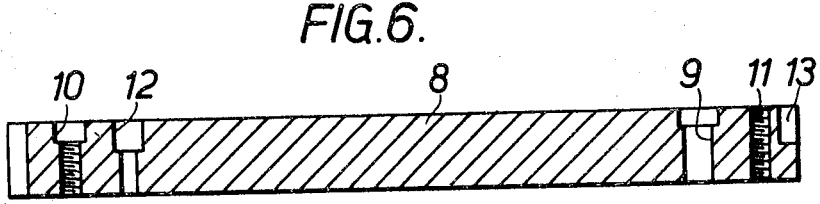
FIG. 6 is a sectional view on the line VI—VI of FIG. 5.

FIGS. 7 and 8 show a workpiece 14 supported from a plate member namely the plate member 7 shown in FIG. 4, secured to the pallet 1. The plate member is placed on the pallet at a desired position and is secured thereto by screws 15 which pass through the fixing holes 9 in the plate member and are threaded into registering tapped fixing holes 2 in the pallet. As mentioned previously, and as can be seen in FIG. 8, each screw 15 has a tapped hole 16 of the same diameter as the holes 11 in the plate member thereby completing the grid of holes 11.

Support devices for the workpiece are then secured to the plate member at selected holes 10 and/or 11, only holes 10 being used in the particular arrangement shown. The left-hand support device shown in FIG. 8 consists of a stepped support member 17 having a flat upper support surface 18 on which the workpiece 14 rests, and having a lower projecting threaded stem 19 which is screwed into a hole 10 in the plate member 7. The right hand support device shown in FIG. 8 consists of a support member 20 having a lower projecting threaded stem 21 which is screwed into a hole 10 in the plate member. The member 20 has a central tapped hole 22 and has a circular recess 23 in its upper face in which a detachable support collar 24 is received. The workpiece 14 is secured to the member 20 by a screw 25 passing through a counterbored hole in the workpiece and a central hole in the collar, and threaded into the tapped hole 22, so that the workpiece is firmly held against the collar 24.

The central support device shown in FIG. 8 consists of a hollow housing member 26 having secured therein the head of a screw 33 which has a threaded stem 27 projecting from the member 26, which stem is screwed into a hole 10 in the plate member 7. The housing contains a screw element 28 having an upper externally threaded stem 29 and a flanged base 30 which abuts against a shoulder 31 in the housing to limit upward movement of the screw element. A spring 32 is located between the flanged base 30 and a base part 33A and urges the screw element 28 upwardly. A detachable collar 34, through which the stem 29 passes, is fitted on top of the housing member 26. When the workpiece 14 is placed on the collar 34 it presses the screw element 28 down against the action of the spring 32. A key can then be inserted through a tapped hole 35 in the workpiece into a hexagonal recess in the top of the stem 29. The key is then used to rotate the screw element 28, which is urged upwardly by the spring 32 to cause the stem 29 to project from the collar 34, and thereby to thread the stem 29 into the hole 35 in the workpiece and secure the latter to the support device.

The pallet 1, with the plate member, support devices, and workpiece secured thereto as explained above, can be fed into a numerically controlled machine tool for machining of the workpiece. After completion of machining the workpiece, support devices, and plate member can be removed from the pallet by a reverse procedure to that described above.

It is to be understood that the particular support devices and plate member, and their positional arrangement relative to the pallet shown in FIGS. 7 and 8 are given solely by way of illustration and example. As explained previously, each of the plate members can be secured to the pallet in a number of different positional relationships, and support devices can be secured to any of the plate members in different positional arrangements. By providing receiving holes 10 and 11 in the plate members on a square grid with a small spacing, a support device can be located at any position on that grid, and the fixing holes 2 in the actual pallet can be on a grid with a relatively large spacing.

In a manner essentially as described in U.S. patent applications Ser. Nos. 718,887 now Pat. No. 3,537,697, 752,391 and 753,204, a template can be used to define a required positional arrangement of plate member, support devices and workpiece to the pallet.

What I claim as my invention and desire to secure by Letters Patent is:

1. An arrangement for supporting workpieces for machining operations comprising a pallet having fixing holes at a plurality of fixing positions arranged in a regular pattern, a plate member having fixing holes at a plurality of fixing positions arranged so that the plate member can be placed on the pallet in a number of different positional relationships thereto in each of which positional relationships fixing holes on the plate member register with fixing holes on the pallet, and fixing means securing the plate member to the pallet at registering fixing holes, said plate member having further fixing holes at fixing positions in a regular pattern at a closer spacing than the fixing holes in the pallet adapted to receive support devices for a workpiece.

2. An arrangement for supporting workpieces for machining operations comprising a pallet having fixing holes at the junctions of a square grid, a plate member having fixing holes at a plurality of fixing positions arranged so that the plate member can be placed on the pallet in a number of different positional relationships thereto in each of which positional relationships fixing holes in the plate member register with fixing holes in the pallet, and fixing means to secure the plate member to the pallet at registering fixing holes, the plate member having further fixing holes arranged in two sets to receive support devices for a workpiece, the fixing holes in each set being arranged at the junctions of a square grid at a smaller spacing than the square grid of the pallet.

3. An arrangement as claimed in claim 2 wherein the holes in the pallet are tapped, and the fixing means to secure the plate member to the pallet is an externally-threaded screw which passes through a hole in the plate member to be screwed into a tapped hole in the pallet, the screw being internally threaded to provide one of the further fixing features of the plate member.

4. An arrangement for supporting workpieces for machining operations comprising a pallet having tapped fixing holes at the junctions of a square grid, a plate member of smaller area than the pallet so that the plate member can be placed on the pallet in a plurality of different positional relationships thereto and having fixing holes registering with tapped fixing holes in the pallet, an externally threaded fixing screw passing through each of at at least two of the registering fixing holes in the pallet and the plate member, the plate member having further fixing holes at the junctions of a square grid at a smaller spacing than the square grid of the pallet, the further fixing holes being tapped, and a support device for the workpiece secured to a tapped hole in the plate member.

5. An arrangement as claimed in claim 4 wherein the fixing holes in the plate member are at junctions of the square grid on which the further fixing holes of the plate member lie, and the externally threaded fixing screws are internally threaded to define tapped fixing holes.

6. An arrangement as claimed in claim 5 wherein the plate member has an additional set of tapped fixing holes at the junctions of a square grid of the same spacing as the further fixing holes and halfway between.

References Cited
UNITED STATES PATENTS

| | | | |
|---|---|---|---|
| 695,659 | 3/1902 | Snyder | 287—125 |
| 2,327,953 | 8/1943 | Zoder | 287—125 |
| 2,624,107 | 1/1953 | Carpenter | 269—309 |
| 3,174,746 | 3/1965 | Bean | 269—297 |

ANDREW R. JUHASZ, Primary Examiner

R. D. EVENSON, Assistant Examiner

U.S. Cl. X.R.

269—309